June 17, 1941.  J. F. BAGBY  2,245,847
PIPE OR HOSE COUPLING
Filed June 22, 1939  2 Sheets-Sheet 1
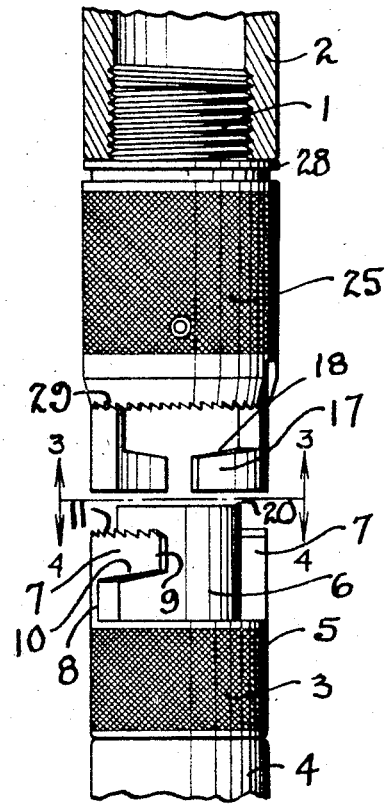
Fig. 2.
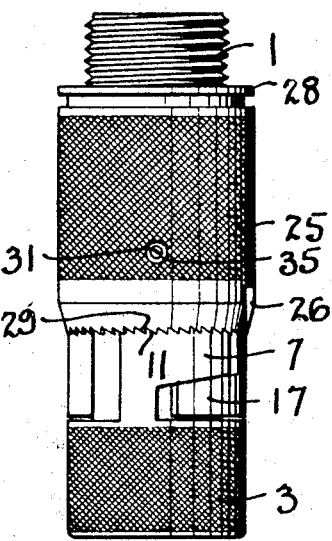
Fig. 1.
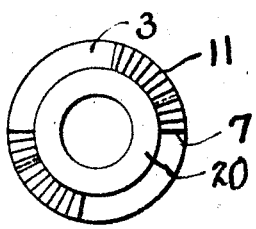
Fig. 4.
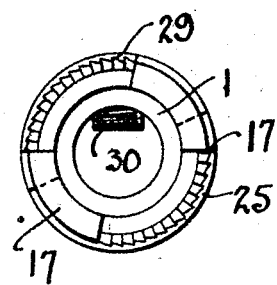
Fig. 3.
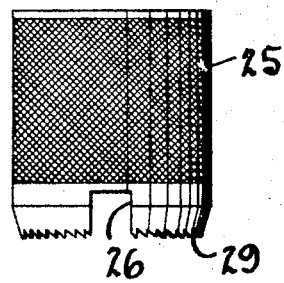
Fig. 7.
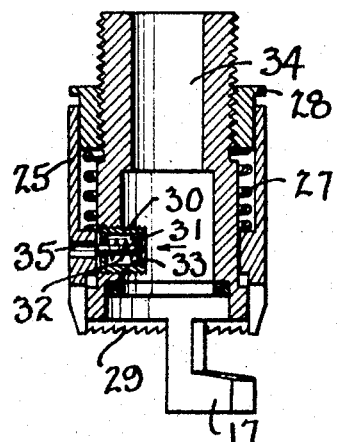
Fig. 5.
Fig. 6.
INVENTOR
JAMES F. BAGBY.
Jesse R. Stone
Lester B. Clark
ATTORNEYS June 17, 1941.    J. F. BAGBY    2,245,847
PIPE OR HOSE COUPLING
Filed June 22, 1939    2 Sheets-Sheet 2

JAMES F BAGBY.
INVENTOR.
Jesse R. Stone
Lester B. Clark
BY
ATTORNEYS.

Patented June 17, 1941

2,245,847

UNITED STATES PATENT OFFICE 2,245,847

PIPE OR HOSE COUPLING

James F. Bagby, Houston, Tex.

Application June 22, 1939, Serial No. 280,494

5 Claims. (Cl. 285—178)

The invention relates to an improvement in pipe or hose couplings of the type which are quickly releasable.

It is one of the objects of the invention to provide a quickly releasable pipe or hose coupling which will be locked against inadverent release.

Another object of the invention is to provide a pair of interfitting coupling members which can be moved longitudinally and then be automatically interlocked against separation.

Still another object of the invention is to provide a pipe or hose coupling which can be quickly released but which is locked against release so long as there is fluid under pressure within the coupling.

Another object of the invention is to provide a safety lock for releasable couplings whereby the couplings cannot be released except when the fluid pressure is relieved inside of the coupling.

Other and further objects of the invention will be readily apparent when the following description is considered in connection with the accompanying drawings wherein:

Fig. 1 is a side elevation of the coupling assembly shown ready for connection to sections of hose or pipe.

Fig. 2 is an expanded view illustrating the manner of moving the connection members longitudinally to be assembled, the sections of hose or pipe to be interconnected being attached to the members.

Figs. 3 and 4 are end elevations looking at the adjacent ends of the coupling members as viewed from the line 3—4 in Fig. 2.

Fig. 5 is a vertical sectional view showing the internal arrangement of the parts.

Fig. 6 is a sectional view showing the locking sleeve and pin construction on line 6—6 of Fig. 5.

Fig. 7 is a side elevation of the latching sleeve.

Figure 8:
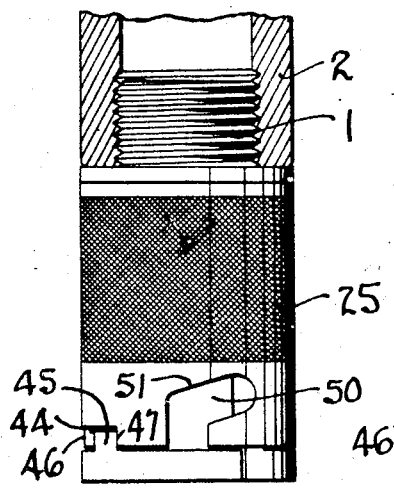
Fig. 8 is an expanded view of an embodiment and is similar to the view shown in Fig. 2.

In Fig. 2 there is shown the coupling member 1 which may be connected to a pipe or hose such as 2, and the cooperating coupling member 3 which may be connected to a pipe or hose 4.

The connecting member 3 is of tubular construction having a knurled surface 5 which may be readily grasped in order to connect and disconnect the coupling. An internal conduit portion 6 serves to conduct the fluid thru the coupling and externally of this conduit 6 are the lugs 7. Two such lugs have been illustrated and they are in the form of a neck 8 and a head 9. The head has an inclined face 10 thereon which is arranged to perform a wedging action with the opposite coupling member. Particular attention is directed to the fact that the conduit 6 extends axially beyond the lugs 7. Each of the lugs has a stepped face 11 on the outer end thereof in order to latch the coupling together as will be hereinafter described.

The coupling member 1 is best seen in section in Fig. 5 and constitutes a tubular sleeve-like member which is recessed internally to provide a shoulder 12 to receive a seal ring 13. The tubular member extends beyond the ring 13 and has the retainer lugs 17 thereon which are arranged to interfit and are oppositely arranged as regards the lugs 7. The wedge faces 18 are arranged to cooperate with the wedge faces 10 in drawing the two coupling members together in a longitudinal direction. As the parts are in the position as in Fig. 2 they will be moved longitudinally until the lug 17 passes beyond the lug 7 and then the members are turned so that the lugs will move in the interfitting position. As the wedging faces 10 and 18 move together the end 20 of the conduit 6 will be forced against the ring 13 to compress it and form a seal so that the parts are firmly connected together and the seal is formed by the partial rotation.

It is desirable to prevent the inadvertent release of the coupling members and with this in mind a sleeve 25 has been slidably mounted over the outside of the coupling member 1. This sleeve is notched at 26 so as to interfit about the shank of the lugs 17 and so that it will be non-rotatable with respect to the coupling member 1. A spring 27 disposed inside of the sleeve is held in place by an adjustable ring 28 so that the sleeve is normally urged toward the coupling member 3.

The end of the sleeve is stepped at 29 with the steps facing in an opposite direction as compared with the steps 11 on the lugs 7 so that when the coupling is assembled and turned to provide a tight connection the spring 27 automatically urges the sleeve 25 into latching position by causing the lugs 11 and 29 to interfit. In this manner the parts cannot be released so long as the sleeve remains in latching position. The ring 28 may be adjusted to provide any latching pressure desired.

In some types of construction and particularly where higher pressures are being conveyed by the pipe or hose, it is dangerous to release a connection of this sort while the pressure is in the pipe and within the coupling.

Fig. 6 shows a construction for preventing the inadvertent release of the device and its release while there is pressure on the coupling. This construction embodies a nipple 30 which is fixed in the coupling 1 and extends radially thru the coupling. This nipple 30 carries a pin 31 which is normally held in retracted position by a spring 32. This pin has a plate 33 on its inner end which is exposed to pressure in the passage 34 thru the coupling. When pressure is present inside of the coupling this pin 31 will move radially outward into the opening 35 in the latching sleeve 25. The pin will thus prevent the latching sleeve from sliding movement and prevent the release of the stepped teeth 29 from the lugs 7. If the operator attempts to release the connection while pressure is present, he will be prevented from doing so because the sleeve 25 is locked against movement. When he releases the pressure the pin 31 will automatically move inward and unlock the latching sleeve 25. The sleeve can then be moved to release the coupling.

Figure 9:
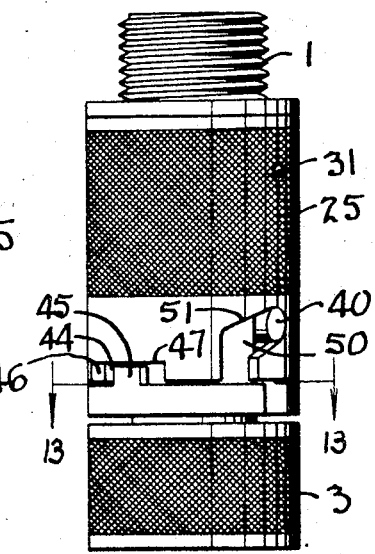
Fig. 9 is a side elevation of the modified form.
Figure 10:
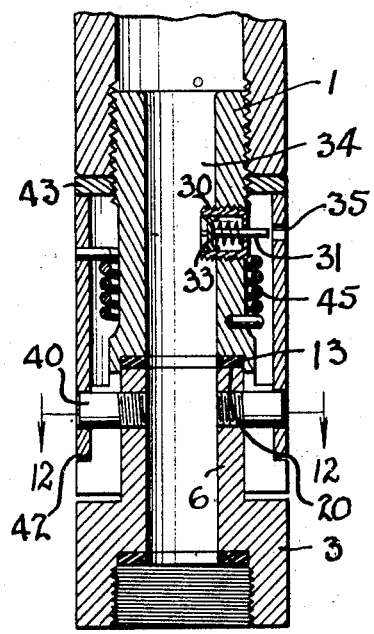
Fig. 10 is a sectional view through the embodiment shown in Figs. 8 and 9.
Figure 12:
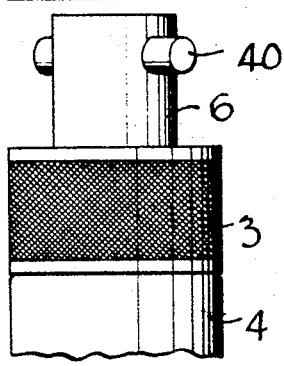
Fig. 12 is a sectional view taken on line 12—12 of Fig. 10.
Figure 11:
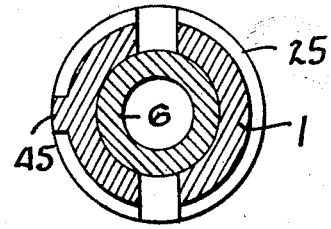
Fig. 11 is a side elevation of the lower connecting member of the modified form.
Figure 13:
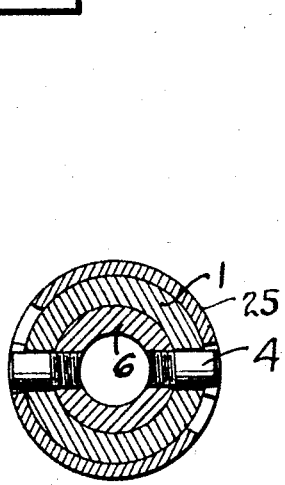
Fig. 13 is a sectional view taken on line 13—13 in Fig. 9.

In the embodiment of the invention as illustrated in Figs. 8 to 13, the conduit is provided with rod like projections 40 which are adapted to enter slots 41 in the upper member 1. The projections 40 may enter the slots 41 a sufficient distance that the end 20 of the conduit 6 engages the ring 13 to effect a seal whereby a continuous leak proof passage 34 thru the couplings is assured. The knurled sleeve 25 surrounds the member 11 between an upwardly facing shoulder 42 and a threaded ring 43 at the upper end of the member 1. This sleeve is angularly movable but such movement is limited by means of an elongated recess 44 in the sleeve 25 into which a small lug 45 on the member 1 projects.

A torsion spring 46 occupies a portion of the space between the sleeve 25 and the member 1 and has its opposite ends anchored to these members. The sleeve 25 therefore tends to rotate in such direction that the face 46 in the recess 44 engages the lug 45.

When the sleeve 25 is rotated manually against the resistance of the spring 46 until the face 47 of the recess 44 engages the lug at 45 and slot 50 in the sleeve 25 is brought into alinement with the slot 41 in the coupling member 1. The lower coupling member 3 may then be advanced until the prongs 40 engage the upper sloping surface 51 of the slot 50. If then the sleeve 25 be released the connecting member 3 will be moved upwardly until the end of the conduit 6 engages the ring 13. Constant torsion produced by the spring 46 causes the projections 40 to ride upon the lower surface of the slot and hence to wedgingly force the projections 40 upwardly so that the seal by the ring 13 between the members 1 and 3 will be effected.

The construction for preventing inadvertent release of the device while pressure exists therein is the same as that shown in the embodiment of Figs. 1 to 6, the pin 31 being forced upwardly under pressure to enter the opening 35 in the sleeve 25.

Broadly the invention contemplates a quickly releasable coupling which will be automatically latched against release and which may be further safe-guarded by being locked when the coupling is subjected to pressure.

What is claimed is:

1. A coupling of the character described comprising a pair of connection members, interfitting means to interlock said members against longitudinal movement, sealing means between said members to be compressed when the members are interfitted, and movable means comprising a movable sleeve carried by one member and urged by an interposed spring to engage the other member to lock said members against rotational movement, and an additional means operable when the connection is subjected to internal fluid pressure to lock said movable means when the coupling is under pressure.

2. A coupling of the character described comprising a pair of connection members, interfitting means to interlock said members against longitudinal movement, sealing means between said members to be compressed when the members are interfitted, and movable means carried by one member to engage the other member to lock said members against rotational movement, and an additional means operable when the connection is subjected to internal fluid pressure to lock said movable means when the coupling is under pressure, said last mentioned means including a radially movable pin operable by pressure within the coupling to move outwardly and engage said movable means.

3. A pipe or hose coupling including a pair of interfitting members, interengaging lugs on said members having wedging faces to draw said member together longitudinally, a sealing ring to be compressed by the wedging action, and additional means operable by fluid under pressure within said coupling to lock said members against release, said last means including a pressure responsive member fixed to one of the interfitting members but movable radially thereof, and a locking sleeve engageable by said pressure responsive member.

4. A pipe or hose coupling including a pair of interfitting members, interengaging lugs on said members having wedging faces to draw said member together longitudinally, the lugs on one of said members having an axially facing stepped surface, a sealing ring to be compressed by the wedging action, and additional means operable by fluid under pressure within said coupling to lock said members against release, including a spring pressed sleeve, having a stepped end surface engageable with the stepped surface on said lugs to lock said members against rotation.

5. A pipe or hose coupling including a pair of interfitting members, lugs on one of said members, a rotatable sleeve on the other of said members, said sleeve having wedging faces to engage said lugs to draw the members together longitudinally, a sealing ring to be compressed between the members by the wedging action to produce a sealed passage through the coupling, and means operable from pressure with the members to lock said sleeve against rotation.

JAMES F. BAGBY.